United States Patent
Lin et al.

(10) Patent No.: US 10,248,410 B2
(45) Date of Patent: Apr. 2, 2019

(54) IMPLEMENTATION DECISION TO PROVIDE ADAS FUNCTION UPDATE FOR A VEHICLE

(71) Applicant: TOYOTA JIDOSHA KABUSHIKI KAISHA, Toyota-shi, Aichi-ken (JP)

(72) Inventors: Chung-Wei Lin, Mountain View, CA (US); Shinichi Shiraishi, Mountain View, CA (US)

( * ) Notice: Subject to any disclaimer, the term of this patent is extended or adjusted under 35 U.S.C. 154(b) by 0 days.

(21) Appl. No.: 15/659,455

(22) Filed: Jul. 25, 2017

(65) Prior Publication Data
US 2019/0034197 A1    Jan. 31, 2019

(51) Int. Cl.
| | |
|---|---|
| G06F 8/658 | (2018.01) |
| B60W 50/00 | (2006.01) |
| H04L 29/08 | (2006.01) |
| H04W 4/80 | (2018.01) |
| H04W 4/12 | (2009.01) |

(52) U.S. Cl.
CPC ......... *G06F 8/658* (2018.02); *B60W 50/0098* (2013.01); *H04L 67/34* (2013.01); *H04W 4/80* (2018.02); *H04L 67/12* (2013.01); *H04W 4/12* (2013.01)

(58) Field of Classification Search
None
See application file for complete search history.

(56) References Cited

U.S. PATENT DOCUMENTS

| | | | |
|---|---|---|---|
| 6,270,350 B1 * | 8/2001 | Christopher | G09B 9/00 434/62 |
| 2011/0015822 A1 * | 1/2011 | Liebl | G07C 5/008 701/31.5 |
| 2012/0059574 A1 * | 3/2012 | Hada | G08G 1/0112 701/119 |

FOREIGN PATENT DOCUMENTS

JP    PO2003-316681    11/2003

OTHER PUBLICATIONS

Xu, "Vehicle-to-Vehicle Safety Messaging in DSRC", 2004, ACM 1-58113-922-5/04/0010 (Year: 2004).*

(Continued)

*Primary Examiner* — Hossain M Morshed
(74) *Attorney, Agent, or Firm* — Burbage Law, P.C.; Jon-Michael Burbage; Elizabeth Ruzich

(57) ABSTRACT

The disclosure includes embodiments for implementing a function update for an Advanced Driver Assistance System ("an ADAS system") of a vehicle. In some embodiments, the method includes the vehicle receiving a Dedicated Short Range Communication message ("a DSRC message") on a 5.9 gigahertz band. The DSRC message includes digital data that describes a driving situation of one or more other vehicles in relation to the vehicle. The method includes determining, based on the driving situation described by the digital data, to implement the function update for the ADAS system by reconfiguring a Field-Programmable Gate Array ("an FPGA") of the vehicle which is operable to control an operation of the ADAS system. The method includes reconfiguring the FPGA of the vehicle to implement the function update so that the FPGA controls the operation of the ADAS system in a manner that conforms to the function update.

20 Claims, 11 Drawing Sheets

(56) References Cited

OTHER PUBLICATIONS

Nitin, "Advanced Driver Assistance System using FPGA", 2014, SlideShare (Year: 2014).*

Shreejith, "Reconfigurable Computing in Next-Generation Automotive Networks", 2013, IEEE (Year: 2013).*

FCC, "Dedicated Short Range Communications (DSRC) Service", Apr. 2017, FCC.gov (Year: 2017).*

* cited by examiner

|  | $B_{US}/B_{UF} = 0/0$ | $B_{US}/B_{UF} = 0/1$ | $B_{US}/B_{UF} = 1/1$ | $B_{US}/B_{UF} = 1/0$ |
|---|---|---|---|---|
| $B_{ES}/B_{EF} = 0/0$ | Infeasible | N/A | Infeasible | Infeasible |
| $B_{ES}/B_{EF} = 0/1$ | FPGA* | N/A | FPGA | FPGA* |
| $B_{ES}/B_{EF} = 1/1$ | Software* | N/A | Software | Software |
| $B_{ES}/B_{EF} = 1/0$ | Software* | N/A | Software | Software |

Analysis Data 193

Key

○ N/A: The scenario does not exist, given the assumption that $T_{UF} > T_{US}$.

○ Software: Determine to implement the ADAS update using a software update.

○ Software*: Determine to implement the ADAS update using a software update. There is a warning message (the implementation will be completed later than expected).

○ FPGA: Determine to implement the ADAS update by updating the FPGA.

○ FPGA*: Determine to implement the ADAS update by updating the FPGA. There is a warning message (the implementation will be completed later than expected).

○ Infeasible: Determine not to implement the ADAS update, and output an error message.

Figure 1H

BSM DATA 195

- Vehicles and other client devices equipped with Direct Short Range Communication ("DSRC") transmit a Basic Safety Message ("BSM") at a regular interval.

- Each BSM includes the following BSM data describing one or more of the following for the vehicle that originally sent the BSM:
    (1) Location Data Describing the Location of the Vehicle, where the Location Data may be so accurate that it describes the specific lane the Vehicle is traveling in;
    (2) Heading Data Describing the Direction of travel for the Vehicle;
    (3) Velocity Data Describing the Velocity of the Vehicle; and
    (4) Path History of Vehicle (e.g., path history data).

Figure 4A

BSM DATA 195

Part 1
Vehicle Position Data (local 3D)
- Latitude
- Longitude
- Elevation
- Positional accuracy
- Time Vehicle Motion Data
- Transmission state
- Speed
- Heading
- Steering wheel angle
- Acceleration set (4-way, i.e., 3 axes of acceleration plus yaw rate
- Brake system status Vehicle Size Data

Part 2
Vehicle Path History
Future Vehicle Path Estimation
Hard Active Braking
Traction Control System active over 100 milliseconds?
Antilock Brake System active over 100 milliseconds?
Light Status
Wiper Status
Vehicle type

Figure 4B

IMPLEMENTATION DECISION TO PROVIDE ADAS FUNCTION UPDATE FOR A VEHICLE

BACKGROUND

The specification relates to providing an implementation decision for how to implement an update for an Advanced Driver Assistance System of a vehicle.

Vehicle control systems are becoming increasingly popular. One example of a vehicle control system is an Advanced Driver Assistance System ("ADAS system" if singular, "ADAS systems" if plural).

Proper functioning of ADAS systems depends on the availability of function updates which modify the functionality provided by the ADAS systems.

SUMMARY

Modern vehicles are equipped with a set of ADAS systems. The set of ADAS systems includes one or more ADAS systems. The one or more ADAS systems require periodic updating to modify or improve the functionality they provide.

Updates that modify or improve the functionality of an ADAS system is referred to as a "function update." There are two possible options for implementing a function update: (1) use software to implement the function update; and (2) use one or more field-programmable gate arrays ("FPGA" if singular, "FPGAs" if plural) to implement the function updates.

In most cases, the execution time for implementing function updates using FPGAs is faster than implementing such updates via software only. However, implementing such updates via FPGA is also generally more expensive and the total time for implementing the function updates using FPGA takes a longer amount of time than the execution time for implementing the function update via software because implementing the function updates using FPGA also includes reconfiguring the FPGA. There is currently no solution that helps a vehicle determine whether to implement function updates for an ADAS system of a vehicle via software updates or FPGA. The update system described herein solves this problem. In this way, the update system improves the performance of a vehicle by determining whether ADAS function updates for the vehicle are implemented by one or more of the following methods: (1) implementing software updates for one or more ADAS systems of the vehicle in such a way that the functionality provided by the one or more ADAS systems is modified in accordance with the function update [herein referred to as "implement the function update via software" or "implementing the function update via software"]; or (2) modifying one or more FPGAs of the vehicle in such a way that the functionality provided by the one or more ADAS systems is modified in accordance with the function update [herein referred to as "implement the function update via FPGA" or "implementing the function update via FPGA"].

As used herein, an "implementation decision" is a decision about whether to implement a function update for an ADAS system of a vehicle via software or FPGA.

The update system described herein provides numerous benefits. For example, the update system determines, based on real-time data describing the current situation of the vehicle, whether it is better to implement the function update via software or FPGA. No other technology provides this functionality. Our research indicates that the update system will lower costs and increase vehicle safety by implementing function updates for ADAS systems in the quickest and cheapest way possible while also meeting both system constraints and the real-world constraints currently being experienced by the vehicle at the time the implementation decision is made by the update system.

In some embodiments, the update system is an element of a vehicle. In some embodiments, the update system is an element of a server. In some embodiments, the vehicle and the server each include their own instance of the update system and the functionality of the update system is distributed across the vehicle and the server. For example, in FIG. 1A, the update system is depicted as an element of the vehicle and the server, and the update system itself is depicted with a dashed line to indicate that the update system may be an element of the vehicle, the server or both the vehicle and the server.

In some embodiments, the vehicle which includes the update system is a DSRC-equipped vehicle. A DSRC-equipped vehicle may include a vehicle that includes one or more of the following elements: a DSRC transceiver and any software or hardware necessary to encode and transmit a DSRC message; a DSRC receiver and any software or hardware necessary to receive and decode a DSRC message; and a DSRC-compliant Global Positioning System (a "DSRC-compliant GPS unit").

A DSRC message is a wireless message that is specially configured to be send and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In the United States, Europe and Asia, DSRC messages are transmitted at 5.9 gigahertz ("GHz"). In the United States, DSRC messages are allocated 75 MHz of spectrum in the 5.9 GHz band. In Europe and Asia, DSRC messages are allocated 30 MHz of spectrum in the 5.9 GHz band. A wireless message, therefore, is not a DSRC message unless it operates in the 5.9 GHz band. A wireless message is also not a DSRC message unless it is transmitted by a DSRC transmitter of a DSRC radio.

Accordingly, a DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 megahertz ("MHz") or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

In some embodiments, a DSRC-equipped vehicle does not include a conventional global positioning system unit ("GPS unit"), and instead includes a DSRC-compliant GPS unit. A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane the vehicle is traveling in even when the vehicle is traveling in a roadway having a plurality of lanes with traffic flowing in the same direction.

In some embodiments, the vehicle which includes the update system wirelessly communicates with other DSRC-equipped devices via DSRC. These other DSRC-equipped devices may include, for example, a different DSRC-equipped vehicle, a roadside unit ("RSU" if singular, "RSUs" if plural), or some other communication devices which is DSRC-equipped. For example, a roadside unit ("RSU") or any other communication device may be DSRC-equipped if it includes one or more of the following elements: a DSRC transceiver and any software or hardware necessary to encode and transmit a DSRC message; and a DSRC receiver and any software or hardware necessary to receive and decode a DSRC message.

The embodiments described herein may use wirelessly transmit digital data to the vehicle which includes the update system via a wireless message such as a DSRC message or a Basic Safety Message ("BSM message"). These wireless messages include BSM data such as depicted in FIGS. 4A and 4B, or some other digital data that describes information similar to the information described by the BSM data. The update system described herein uses this BSM data (or some other similar data transmitted via DSRC) to determine whether to implement the function update via software of FPGA. This BSM data provides real-time data that describes the current driving situation or context in which the function update will be implemented, which is beneficial, for example, for ensuring that the function update is implemented in a safe and efficient manner.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method implementing a function update for an ADAS system of a vehicle, the method including: receiving a DSRC message on a 5.9 GHz band, where the DSRC message includes digital data that describes a driving situation of one or more other vehicles in relation to the vehicle; determining, based on the driving situation described by the digital data, to implement the function update for the ADAS system by reconfiguring an FPGA of the vehicle which is operable to control an operation of the ADAS system; and reconfiguring the FPGA of the vehicle to implement the function update so that the FPGA controls the operation of the ADAS system in a manner that conforms to the function update. Other embodiments of this aspect include corresponding computer systems, apparatus, and computer programs recorded on one or more computer storage devices, each configured to perform the actions of the methods.

Implementations may include one or more of the following features. The method where the DSRC message is a BSM message and the digital data is BSM data. The method where the DSRC message is transmitted to the vehicle by a roadside unit ("RSU"). The method where the digital data describes a geographic location of the one or more other vehicles with an accuracy of plus or minus 1.5 meters relative to an actual geographic location of the one or more other vehicles. The method where the FPGA is an element of an electronic control unit of the vehicle. The method where the FPGA is reconfigured based on update data which describes how to reconfigure the FPGA in order to implement the function update. The method where the function update modifies a functionality provided by the ADAS system. Implementations of the described techniques may include hardware, a method or process, or computer software on a computer-accessible medium.

One general aspect includes a system including a vehicle, the vehicle including: an ADAS system; a DSRC receiver; an FPGA; and an onboard vehicle computer system that is communicatively coupled to the ADAS system, the DSRC receiver and the FPGA, the onboard vehicle computer system including a non-transitory memory storing computer code which, when executed by the onboard vehicle computer system causes the onboard vehicle computer system to: receive, by the DSRC receiver, a DSRC message on a 5.9 GHz band, where the DSRC message includes digital data that describes a driving situation of one or more other vehicles in relation to the vehicle; determine, based on the driving situation described by the digital data, to implement a function update for the ADAS system by reconfiguring the FPGA which is operable to control an operation of the ADAS system; and reconfigure the FPGA to implement the function update so that the FPGA controls the operation of the ADAS system in a manner that conforms to the function update. Other embodiments of this aspect include corresponding computer systems, apparatus, and computer programs recorded on one or more computer storage devices, each configured to perform the actions of the methods.

Implementations may include one or more of the following features. The system where the DSRC message is a BSM message and the digital data is BSM data. The system where the DSRC message is transmitted to the vehicle by an RSU. The system where the digital data describes a geographic location of the one or more other vehicles with an accuracy of plus or minus 1.5 meters relative to an actual geographic location of the one or more other vehicles. The system where the FPGA is an element of an electronic control unit of the vehicle. The system where the FPGA is reconfigured based on update data which describes how to reconfigure the FPGA in order to implement the function update. The system where the function update modifies a functionality provided by the ADAS system. Implementations of the described techniques may include hardware, a method or process, or computer software on a computer-accessible medium.

One general aspect includes a computer program product including a non-transitory memory of an onboard vehicle computer system of a vehicle storing computer-executable code that, when executed by a processor, causes the processor to: receive a DSRC message on a 5.9 gigahertz band, where the DSRC message includes digital data that describes a driving situation of one or more other vehicles in relation to the vehicle; determine, based on the driving situation described by the digital data, to implement a function update for an ADAS system of the vehicle by reconfiguring a FPGA of the vehicle which is operable to control an operation of the ADAS system; and reconfigure the FPGA of the vehicle to implement the function update so that the FPGA controls the operation of the ADAS system in a manner that conforms to the function update. Other embodiments of this aspect include corresponding computer systems, apparatus, and computer programs recorded on one or more computer storage devices, each configured to perform the actions of the methods.

Implementations may include one or more of the following features. The computer program product where the DSRC message is a BSM message and the digital data is BSM data. The computer program product where the DSRC message is transmitted to the vehicle by an RSU. The computer program product where the digital data describes a geographic location of the one or more other vehicles with an accuracy of plus or minus 1.5 meters relative to an actual geographic location of the one or more other vehicles. The computer program product where the FPGA is an element of an electronic control unit of the vehicle. The computer program product where the FPGA is reconfigured based on update data which describes how to reconfigure the FPGA in order to implement the function update. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIG. 1H is a block diagram illustrating analysis data according to some embodiments.

FIG. 4A is a block diagram illustrating an example of BSM data according to some embodiments.

FIG. 4B is a block diagram illustrating an example of BSM data according to some embodiments.

DETAILED DESCRIPTION

Figure 1A:
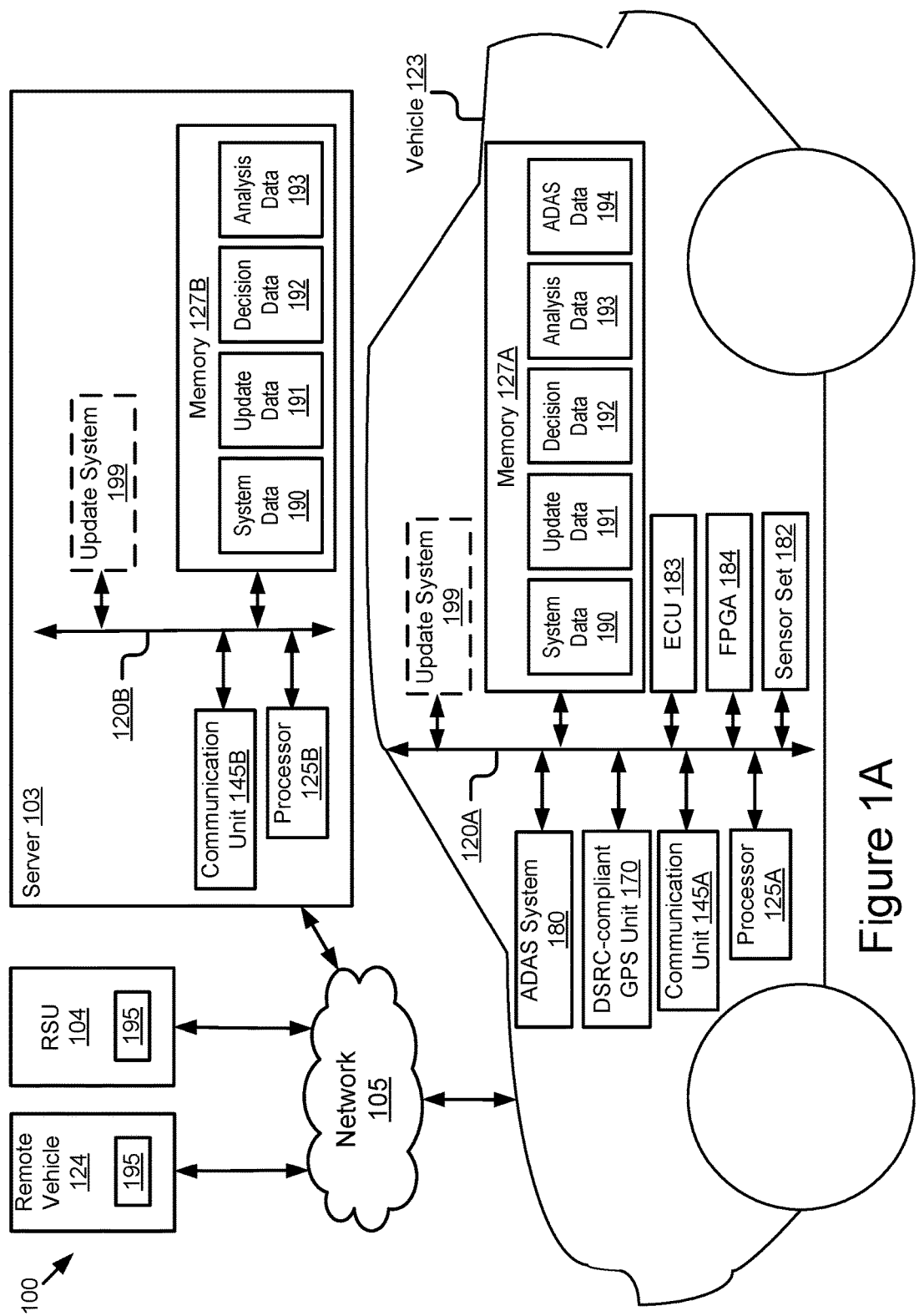
FIG. 1A is a block diagram illustrating an operating environment for an update system according to some embodiments.

A vehicle includes an ADAS system and an update system. Function updates are periodically implemented for the ADAS system in order to modify the functionality provided by the ADAS system. Described herein are embodiments of an update system that determines whether to implement the function update using either software update for the ADAS system or by reconfiguring an FPGA of the vehicle which controls the operation of the ADAS system.

Examples of a Wireless Messages

Vehicles are increasingly equipped with DSRC. A vehicle equipped with DSRC may be referred to as "DSRC-equipped." A DSRC-equipped vehicle may include a DSRC antenna and any hardware of software necessary to send and receive DSRC messages, generate DSRC messages and read DSRC messages. For example, a DSRC-equipped vehicle may include any hardware or software necessary to receive a DSRC message, retrieve data included in the DSRC message and read the data included in the DSRC message.

The one or more wireless messages may include a DSRC message. There are many types of DSRC messages. One type of DSRC message is known as a BSM. DSRC-equipped vehicles broadcast a BSM at a regular interval. The interval may be user adjustable.

A BSM includes BSM data. The BSM data describes attributes of the vehicle that originally transmitted the BSM. Vehicles equipped with DSRC may broadcast BSMs at an adjustable rate. In some embodiments, the rate may be once every 0.10 seconds. The BSM includes BSM data that describes, among other things, one or more of the following: (1) the path history of the vehicle that transmits the BSM; (2) the speed of the vehicle that transmits the BSM; and (3) the GPS data (sometimes referred to as "global positioning system data" or "GPS data") describing a location of the vehicle that transmits the BSM. FIGS. 4A and 4B, which are described below, depict examples of BSM data according to some embodiments.

In some embodiments, DSRC-equipped vehicles may probe other DSRC-equipped vehicles/devices along the roadway for information describing their current and future conditions, including their path history, future path and remote sensor data they may have received or generated. This information is described as "DSRC probe data." DSRC probe data may include any data received via a DSRC probe or responsive to a DSRC probe.

A DSRC message may include DSRC-based data. The DSRC-based data may include BSM data or DSRC probe data. In some embodiments, the DSRC-based data included in a DSRC message may include BSM data or DSRC probe data received from a plurality of DSRC-equipped vehicles (or other DSRC-equipped devices). This BSM data or DSRC probe data may include an identifier of its source and the location of the source or any traffic events described by the BSM data or DSRC probe data.

In some embodiments, the DSRC-enabled vehicles will include a DSRC-compliant GPS unit. The BSM data or DSRC probe data may specify which lane a vehicle is traveling in as well as its speed of travel and path history. The BSM data or DSRC probe data may further specify one or more of the following: a velocity of the vehicle at one or more different times or one or more different locations; a heading of the vehicle at one or more different times or one or more different locations; and an acceleration of the vehicle at one or more different times or one or more different locations.

Another type of wireless message is a full-duplex wireless message described in U.S. patent application Ser. No. 14/471,387 filed on Aug. 28, 2014 and entitled "Full-Duplex Coordination System," the entirety of which is herein incorporated by reference.

Examples of Lane Level Accuracy

Vehicles are also increasingly manufactured to include GPS-based navigation systems. A GPS-based navigation system may provide navigation routes to a driver that are based on GPS data and knowledge about queue lengths along roadways.

Lane level accuracy may mean that the location of a vehicle is described so accurately that the vehicle's lane of travel may be accurately determined. A conventional GPS system is unable to determine the location of a vehicle with lane-level accuracy. For example, a typical lane of a roadway is approximately 3 meters wide. However, a conventional GPS system may only have an accuracy of plus or minus 10 meters relative to the actual location of the vehicle.

A DSRC-compliant GPS unit provides GPS data describing the location of a vehicle with lane-level accuracy. A DSRC-compliant GPS unit may include hardware that wirelessly communicates with a GPS satellite to retrieve GPS data that describes a location of a vehicle with a precision that is compliant with the DSRC standard. The DSRC standard requires that GPS data be precise enough to infer if two vehicles are in the same lane. The lane may be a lane of a roadway. A DSRC-compliant GPS unit may be operable to identify, monitor and track its two-dimensional position within 1.5 meters of its actual position 68% of the time under an open sky. Since lanes of a roadway are typically no less than 3 meters wide, whenever the two-dimensional error of the GPS data is less than 1.5 meters the update system described herein may analyze the GPS data provided by the DSRC-compliant GPS unit and determine what lane of the roadway the vehicle is traveling in based on the relative positions of vehicles on the roadway.

ADAS System

Examples of an ADAS system may include one or more of the following elements of a vehicle: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

The ADAS system may also include any software or hardware included in the vehicle that makes that vehicle be an autonomous vehicle or a semi-autonomous vehicle.

In some embodiments, a function update for one or more ADAS systems of the vehicle are implemented via a software update. In other embodiments, the one or more ADAS systems include or are communicatively coupled to one or more FPGAs whose configuration controls, or at least partially controls, the operation of the one or more ADAS systems such that the function update can be implemented by reconfiguring the one or more FPGAs.

Notification

In some embodiments, the update system may provide a notification to a driver of the vehicle to inform them of whether the function update will be implemented using a software update for the ADAS system or by reconfiguring the FPGA of the vehicle. The notification provided to the driver of the vehicle may include a visual notification such as a graphical user interface ("GUI"), an audio notification such as audio generated by one or more speakers or a combination of a visual notification and an audio notification provided simultaneously or contemporaneously.

The visual notification may be provided by a heads-up display unit or an electronic panel. The heads-up display unit may include a three-dimensional heads-up display unit such as the one described in U.S. patent application Ser. No. 15/080,433 filed on Mar. 24, 2016 and entitled "Wireless Data Sharing Between a Mobile Client Device and a Three-Dimensional Heads-Up Display Unit," the entirety of which is herein incorporated by reference.

The electronic panel may be an element of a head-unit or an infotainment system installed in the vehicle.

The audio notification may be provided by one or more speakers that are operated by the head-unit, infotainment system or navigation system of the vehicle.

Example Overview

Referring to FIG. 1A, depicted is an operating environment 100 for an update system 199. The operating environment 100 may include one or more of the following elements: a vehicle 123; a remote vehicle 124; a roadside unit 104 ("RSU 104"); and a server 103. These elements of the operating environment 100 may be communicatively coupled to a network 105.

In some embodiments, the server 103 may be an element of the RSU 104. In some embodiments, the server 103 may be a separate element from the RSU. For example, the server 103 may be a server or some other processor-based computing device that is operable to send and receive messages via the network 105. The RSU 104 and the server 103 are described in more detail below.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, etc. The network 105 may also include a mobile data network that may include 3G, 4G, LTE, VoLTE or any other cellular network, mobile data network or combination of mobile data networks. Further, the network 105 may include one or more IEEE 802.11 wireless networks.

In some embodiments, one or more of the vehicle 123, the remote vehicle 124, the RSU 104 and the server 103 may be DSCR-equipped. The network 105 may include one or more communication channels shared among the vehicle 123 and one or more other wireless communication devices (e.g., one or more remote vehicles 124, RSUs 104, servers 103, etc.). The communication channel may include DSRC, full-duplex wireless communication or any other wireless communication protocol. For example, the network 105 may be used to transmit a DSRC message, DSRC probe or BSM including BSM data 195 (or similar data) to the vehicle 123.

The vehicle 123 and the remote vehicle 124 may include the same or similar elements. The vehicle 123 and the remote vehicle 124 may share a connection or association. For example, the vehicle 123 and the remote vehicle 124 may share a common manufacturer (e.g., Toyota) and the functionality described herein may only be provided to vehicles having this common manufacturer.

The vehicle 123 may include a car, a truck, a sports utility vehicle, a bus, a semi-truck, a drone or any other roadway-based conveyance. In some embodiments, the vehicle 123 may include an autonomous vehicle or a semi-autonomous vehicle. For example, the vehicle 123 may include an ADAS system set which includes one or more ADAS systems which provide sufficient ADAS functionality to render the vehicle 123 an autonomous vehicle.

The vehicle 123 includes one or more of the following elements: a sensor set 182; a processor 125A; a memory 127A; a communication unit 145A; a DSRC-compliant GPS unit 170; an ADAS system 180; an electronic control unit 183 ("ECU 183"); a FPGA 184; and an update system 199. These elements of the vehicle 123 may be communicatively coupled to one another via a bus 120A.

In some embodiments, the update system 199 is an element of the vehicle 123. In some embodiments, the update system 199 is an element of a server 103. In some embodiments, the vehicle 123 and the server 103 each include their own instance of the update system 199 and the functionality of the update system 199 is distributed across the vehicle 123 and the server 103. For example, the update system 199 is depicted with a dashed line in FIG. 1A to indicate that the update system 199 may be an element of the vehicle 123, the server 103 or both the vehicle 123 and the server 103.

In some embodiments, the processor 125A and the memory 127A may be elements of an onboard vehicle computer system (not pictured). The onboard vehicle computer system may be operable to cause or control the operation of the update system 199. The onboard vehicle computer system may be operable to access and execute the data stored on the memory 127A to provide the functionality described herein for the update system 199 or its elements. In some embodiments, the processor 125A and the memory 127A are elements of the ECU 183.

The sensor set 182 may include one or more sensors that are operable to measure the physical environment outside of the vehicle 123. For example, the sensor set 182 may record one or more physical characteristics of the physical environment that is proximate to the vehicle 123.

In some embodiments, the sensor set 182 may include one or more of the following vehicle sensors: a camera; a LIDAR sensor; a laser altimeter; a navigation sensor (e.g., a global positioning system sensor of the DSRC-compliant GPS unit 170); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set 182 may be operable to record data (optionally referred to herein as "sensor data") that describes one or more locations of the vehicle 123 at one or more different times; this data may be timestamped to indicate the time when the vehicle 123 was at this particular location.

The processor 125A includes an arithmetic logic unit, a microprocessor, a general-purpose controller, or some other processor array to perform computations and provide electronic display signals to a display device. The processor 125A processes data signals and may include various computing architectures including a complex instruction set computer (CISC) architecture, a reduced instruction set computer (RISC) architecture, or an architecture implementing a combination of instruction sets. Although FIG. 1A includes a single processor 125A, multiple processors may be included. Other processors, operating systems, sensors, displays, and physical configurations may be possible.

The memory 127A stores instructions or data that may be executed by the processor 125A. The instructions or data may include code for performing the techniques described herein. The memory 127A may be a dynamic random access memory (DRAM) device, a static random access memory (SRAM) device, flash memory, or some other memory device. In some embodiments, the memory 127A also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 1A, in some embodiments the memory 127A stores one or more of the following elements: system data 190; update data 191; decision data 192; analysis data 193; and ADAS data 194.

The system data 190 is digital data that describes one or more variables or factors which affect whether a function update for the ADAS system 180 should be implemented by either providing a software update for the ADAS data 194 or reconfiguring the FPGA 184. In some embodiments, the system data 190 includes BSM data 195 received from one or more of the remote vehicle 124 and the RSU 104. The system data 190 is described in more detail below with reference to FIGS. 1B, 1C, 1D, 1E and 1F.

The update data 191 is digital data that describes how to implement the function update for the ADAS system 180. In some embodiments, the content of the update data 191 is variable based on the implementation decision.

For example, if the implementation decision is to implement the function update using a software update for the ADAS system 180, then the update data 191 is digital data that describes an executable file which implements the function update when it is installed in the memory 127A or executed by the processor 125A.

In another example, if the implementation decision is to implement the function update by reconfiguring the FPGA 184, then the update data 191 is digital data that describes how to reconfigure the FPGA 184 in order to implement the function update (i.e., in order to modify the operation of the ADAS system 180 so that the operation of the ADAS system 180 is consistent with the function update for the ADAS system 180).

The decision data 192 is digital data that provides a framework or protocol for comparing elements of the system data 190 to one another so that the update system 199 can determine whether to implement a function update described by the update data 191 using either a software update for the ADAS data 194 or a reconfiguration of the FPGA 184. In some embodiments, the update system 199 outputs a set of binary variables responsive to analyzing the system data 190 using the decision data 192. The set of binary variables are then inputted in a data structure described by the analysis data 193 as a sub-step of the update system 199 making the implementation decision. The decision data 192 is described in more detail below with reference to FIG. 1G.

The analysis data 193 is digital data that describes a data structure for analyzing the system data 190. In some embodiments, the analysis data 193 describes a data structure for analyzing the set of binary variables outputted by the update system 199 after analyzing the system data 190 using the decision data 192. In some embodiments, the analysis data 193 is a table such as the one depicted in FIG. 1H. The analysis data 193 is described in more detail below with reference to FIG. 1H.

The ADAS data 194 is digital data that describes the code and routines which, when executed by the processor 125A, cause the ADAS system 180 to provide its functionality. For example, the ADAS data 194 is software for the ADAS system 180 which, when executed by the processor 125, causes the ADAS system 180 to provide its functionality.

The communication unit 145A transmits and receives data to and from a network 105 or to another communication channel. In some embodiments, the communication unit 145A includes a DSRC transceiver, a DSRC receiver and other hardware or software necessary to make the vehicle 123 a DSRC-enabled device. In some embodiments, one or more of the remote vehicle 124 and the RSU 104 include a communication unit 145A and a DSRC-compliant GPS unit 170 such that these elements of the operating environment 100 are DSRC-equipped devices.

In some embodiments, the communication unit 145A includes a port for direct physical connection to the network 105 or to another communication channel. For example, the communication unit 145A includes a USB, SD, CAT-5, or similar port for wired communication with the network 105. In some embodiments, the communication unit 145A includes a wireless transceiver for exchanging data with the network 105 or other communication channels using one or more wireless communication methods, including: IEEE 802.11; IEEE 802.16, BLUETOOTH®; EN ISO 14906: 2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145A includes a full-duplex coordination system as described in U.S. patent application Ser. No. 14/471,387 filed on Aug. 28, 2014 and entitled "Full-Duplex Coordination System."

In some embodiments, the communication unit 145A includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145A includes a wired port and a wireless transceiver. The communication unit 145A also provides other conventional connections to the network 105 for distribution of files or media objects using standard network protocols including TCP/IP, HTTP, HTTPS, and SMTP, millimeter wave, DSRC, etc.

The DSRC-compliant GPS unit 170 may include hardware that wirelessly communicates with a GPS satellite to retrieve GPS data that describes a location of the vehicle 123. In some embodiments, a DSRC-compliant GPS unit 170 is operable to provide GPS data that describes the location of the vehicle 123 to a lane-level degree of precision. The DSRC standard requires that GPS data be precise enough to infer if two vehicles (such as vehicle 123 and another vehicle on the same roadway as the vehicle 123) are in the same lane. The DSRC-compliant GPS unit 170 may be operable to identify, monitor and track its two-dimensional position within 1.5 meters of its actual position 68% of the time under an open sky. Since lanes of a roadway are typically no less than 3 meters wide, whenever the two-dimensional error of the GPS data is less than 1.5 meters the update system 199 may analyze the GPS data provided by the DSRC-compliant GPS unit 170 and determine what lane of the roadway the vehicle 123 is traveling in based on the relative positions of vehicles on the roadway. Similarly, the remote vehicle 124 includes a DSRC-compliant GPS unit 170 which provides GPS data which is included as an element of the BSM data 195 and describes the geographic location of the remote vehicle 124 with a similar degree of precision.

By comparison, a GPS unit which is not compliant with the DSRC standard is far less accurate than the DSRC-compliant GPS unit 170 and not capable of reliably providing lane-level accuracy, as is the DSRC-compliant GPS unit 170. For example, a non-DSRC-compliant GPS unit may have an accuracy on the order of 10 meters, which is not sufficiently precise to provide the lane-level degree of precision provided by the DSRC-compliant GPS unit 170. For example, since a lane may be as narrow as 3 meters wide, the DSRC standard may require a DSRC-compliant GPS unit 170 to have an accuracy on the order of 1.5 meters, which is significantly more precise than a non-DSRC-compliant GPS unit as described above. As a result, a non-DSRC-compliant GPS unit may not be able to provide GPS data that is accurate enough to enable the update system 199 to determine how close other vehicles (such as the remote vehicle 124) are to the vehicle 123, which impedes the ability of the update system 199 to accurately understand the context of the vehicle 123 when a function update is being implemented. Not having this context information adversely affects the ability of the update system 199 to make the best possible implementation decision since whether a software update or FPGA reconfiguration for the implementation of the function update is selected is determined based in part on such information. The functionality and precision of the GPS data provided by the DSRC-compliant GPS unit 170 is therefore beneficial for this example reason.

The ADAS system 180 may include one or more advanced driver assistance systems. Examples of an ADAS system 180 may include one or more of the following elements of the vehicle 123: an ACC system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

In some embodiments, the ADAS system 180 includes any hardware or software that controls one or more operations of the vehicle 123 so that the vehicle 123 is "autonomous" or "semi-autonomous."

The ECU 183 is a conventional electronic control unit. In some embodiments, the ECU 183 is an element of an onboard vehicle computer of the vehicle 123. In some embodiments, the ECU 183 is an element of an onboard unit of the vehicle 123. In some embodiments, the ECU 183 is operable to control the operation of the ADAS system 180. For example, the ECU 183 is the processor-based computing device of the vehicle 123 which controls the operation of the ADAS system 180. In some embodiments, the ECU 183 executes the ADAS data 194 in order to provide the functionality of the ADAS system 180.

The FPGA 184 is a conventional field-programmable gate array. In some embodiments, the FPGA 184 is an element of the ADAS system 180. In some embodiments, the ADAS system 180 is an element of the FPGA 184.

In some embodiments, the FPGA 184 is a hardware FPGA which is configured to provide the functionality of the ADAS system 180. For example, the FPGA 184 is operable so that execution of the FPGA 184 provides some or all of the functionality of the ADAS system 180 (herein "ADAS functionality"). In some embodiments, modifying the configuration of the FPGA 184 modifies the ADAS functionality provided by the FPGA 184. For example, in some embodiments the FPGA 184 is operable so that reconfiguring the FPGA 184 based on the update data 191 causes the FPGA 184 to provide modified ADAS functionality which is consistent with the function update described by the update data 191.

In some embodiments, the FPGA 184 is an element of the ECU 183. In some embodiments, the ECU 183 is a processor-based computing devices which executes the code and routines of the update system 199 of the vehicle 123.

In some embodiments, the update system 199 includes code or routines that are operable, when executed by the processor 125A, to cause the processor 125A to aggregate the system data 190 and make the implementation decision for a function update based on one or more of the system data 190, the decision data 192 and the analysis data 193.

In some embodiments, the update system 199 includes code or routines that are operable, when executed by the processor 125A, to cause the processor 125A to build and transmit a wireless message to the network 105 that includes digital data such as the system data 190; the server 103 receives the wireless message and makes the implementation decision for the function update based on one or more of the system data 190, the decision data 192 and the analysis data 193; the server 103 then provides the update data 191 to the update system 199 of the vehicle 123 via the network 105.

In some embodiments, the update system 199 includes code or routines that are operable, when executed by the processor 125A, to cause the processor 125A to execute one or more steps of the method 300 described below with references to FIGS. 3A-3C.

In some embodiments, the update system 199 may be implemented using hardware including an FPGA or an application-specific integrated circuit ("ASIC"). In some other embodiments, the update system 199 may be implemented using a combination of hardware and software. The update system 199 may be stored in a combination of the devices (e.g., servers or other devices), or in one of the devices.

The update system 199 is described in more detail below with reference to FIGS. 1B-1H, 2 and 3A-3C.

Although not depicted in FIG. 1A, in some embodiments the vehicle 123 may include a full-duplex coordination system as described in U.S. patent application Ser. No. 14/471,387 filed on Aug. 28, 2014 and entitled "Full-Duplex Coordination System."

In some embodiments, the full-duplex coordination system of the vehicle 123 may receive a full-duplex wireless message that includes any of the digital data stored on the memory 127A.

The server 103 is a processor based computing device. For example, the computing device may include a stand-alone hardware server. In some embodiments, the server 103 is communicatively coupled to the network 105. The server 103 may include network communication capabilities.

The server 103 includes one or more of the following elements: a processor 125B; a memory 127B; a communication unit 145B; and an update system 199. These elements of the server 103 are communicatively coupled to one another via a bus 120B.

The following elements of the server 103 are similar to those described above for the vehicle 123, and so, those descriptions will not be repeated here: the processor 125B; the memory 127B; the communication unit 145B; and the update system 199. The memory 127B of the server 103 may store digital data similar to the digital data stored in the memory 127A of the vehicle 123.

The server 103 may be operable to send and receive wireless messages via the network 105. For example, the update system 199 of the vehicle 123 causes the communication unit 145A of the vehicle to send a wireless message to the server 103 via the network 105. The wireless message includes a request for the update data 191 as well as the system data 190. The communication unit 145B of the server 103 receives the wireless message from the network 105 and provides the wireless message, including the request and the system data 190, to the update system 199 of the server 103. The update system 199 of the server 103 makes the implementation decision based at least in part on the system data 190, generates the update data 191 based on the implementation decision, and causes the communication unit 145B of the server 103 to provide the update data 191 to the vehicle 123 via the network 105.

The remote vehicle 124 may include elements similar to the vehicle 123, and so, those descriptions will not be repeated here. As depicted, the remote vehicle 124 is a DSRC-equipped device that includes a DSRC-compliant GPS unit 170 and a communication unit 145A having a DSRC transmitter and a DSRC receiver which are operable to send and receive DSRC messages (e.g., BSM messages) which include the BSM data 195 or data similar to the BSM data 195. The BSM data 195 is described in more detail below with reference to FIGS. 4A and 4B.

The RSU 104 may include a non-transitory memory that stores BSM data 195. The RSU 104 also includes a communication unit 145A (not pictured). The RSU 104 may also include a sensor set 182 that records the sensor data. In the alternative to recording the sensor data directly using its own sensor set 182, the RSU 104 may relay sensor data recorded by a sensor set of the remote vehicle 124 to the vehicle 123 as an element of a BSM message or some other DSRC message. For example, if the vehicle 123 is outside of communication range of the remote vehicle 124, then the RSU 104 may relay a wireless message including the BSM data 195 to the vehicle 123.

Figure 1B:
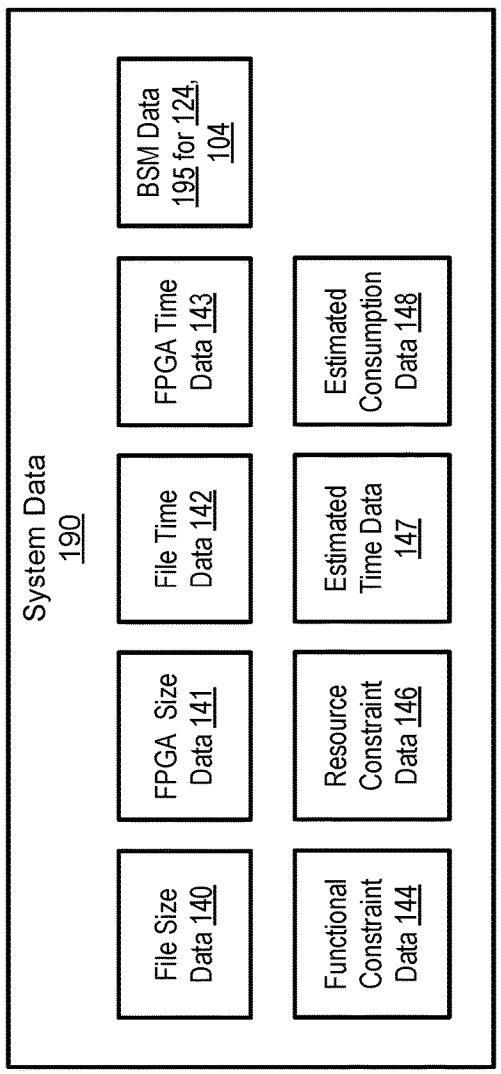
FIG. 1B is a block diagram illustrating system data according to some embodiments.

Referring now to FIG. 1B, depicted is a block diagram illustrating system data 190 according to some embodiments. As depicted, the system data 190 includes one or more of the following types of digital data: file size data 140; FPGA size data 141; file time data 142; FPGA time data 143; BSM data 195 from one or more of the remote vehicle 124 and the RSU 104; functional constraint data 144; resource constraint data 146; estimated time data 147; and estimated consumption data 148.

The file size data 140 is digital data that describes a size of the executable file which would be used to implement the function update via a software update. For example, if the implementation decision is that the function update is implemented via a software update, then the file size data 140 describes the file size of the executable file which is installed in the vehicle 123 in order to implement the function update; the executable file itself is described by the update data 191 in this embodiment.

The FPGA size data 141 is digital data that describes a size (or area) of the FPGA 184 which would be reconfigured in order to implement the function update as an FPGA reconfiguration. For example, the FPGA 184 has a certain area and, if the implementation decision is that the function update is implemented via an FPGA reconfiguration, then the FPGA size data 141 describes a size or area of the FPGA 184 which is reconfigured in order to implement the function update; in this embodiment, the update data 191 is a bitstream that describes how to reconfigure the FPGA 184.

The file time data 142 is digital data that describes a normalized amount of time needed to install the executable file or completely execute the executable file which is used to implement the function update as a software update. For example, if the implementation decision is that the function update is implemented via a software update, then the file time data 142 describes a normalized amount of time needed to completely execute the executable file (e.g., install the executable file) on a standardized software platform which may or may not be the same as the software platform present on the vehicle 123.

The FPGA time data 143 is digital data that describes a normalized amount of time needed to reconfigure or completely execute the executable file. For example, if the implementation decision is that the function update is implemented via an FPGA reconfiguration, then the FPGA time data 143 describes a normalized amount of time needed to completely reconfigure the FPGA on a standardized software platform which may or may not be the same as the software platform present on the vehicle 123.

The BSM data 195 is described in more detail below with reference to FIGS. 4A and 4B. The system data 190 may include any or all of the information included in the BSM data 195.

In some embodiments, the system data 190 includes the following elements of the BSM data 195 included in Part I of one or more BSM messages received from one or more remote vehicles 124: latitude for one or more remote vehicles 124; longitude for one or more remote vehicles 124; elevation for one or more remote vehicles 124; positional accuracy for one or more remote vehicles 124; transmission setting for one or more remote vehicles 124; current speed for one or more remote vehicles 124; current heading for one or more remote vehicles 124; current steering wheel angle for one or more remote vehicles 124; current acceleration for one or more remote vehicles 124; current status of the braking systems for one or more remote vehicles 124; and a vehicle size for one or more remote vehicles 124.

In some embodiments, the system data 190 includes the following elements of the BSM data 195 included in Part II of one or more BSM messages received from one or more remote vehicles 124: one or more event flags which describe one or more nearby roadway events which are relevant to determining an execution deadline ($T_E'$) for completing the function update; path history data that describes one or more past locations of one or more remote vehicles 124; and path prediction data that describes one or more intended future paths for one or more remote vehicles 124.

The functional constraint data 144 is described below with reference to FIG. 1C. The resource constraint data 146 is described below with reference to FIG. 1D. The estimated time data 147 is described below with reference to FIG. 1E. The estimated consumption data 148 is described below with reference to FIG. 1F.

Figure 1D:
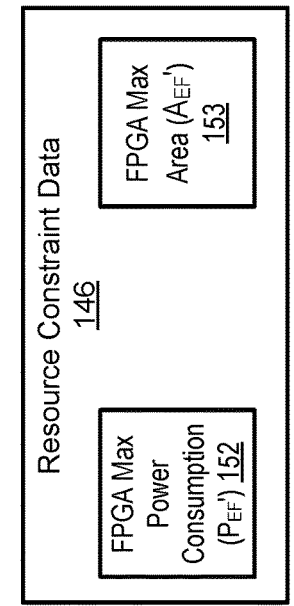
FIG. 1D is a block diagram illustrating resource constraint data according to some embodiments.
Figure 1C:
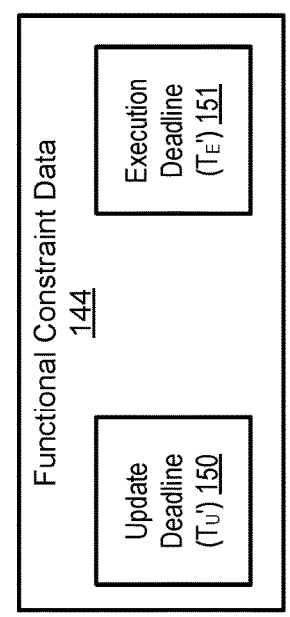
FIG. 1C is a block diagram illustrating functional constraint data according to some embodiments.

Referring now to FIG. 1C, depicted is a block diagram illustrating the functional constraint data 144 according to some embodiments.

The update deadline 150 is digital data that describes a soft deadline for completing the function update. In some embodiments, if the soft deadline is missed, then the function update is still implemented by the update system 199 and the update system 199 causes an electronic display, HUD or 3D-HUD of the vehicle 123 to display a warning message for the driver of the vehicle 123 which visually indicates that the function update will be completed later than expected.

The update deadline 150 may be represented by the variable $T_u'$, which is assigned a value (e.g., a time for the soft deadline) which is described by the update deadline 150.

The execution deadline 151 is digital data that describes a hard deadline for completing the function update. In some embodiments, if the hard deadline is missed, then the function update is not implemented by the update system 199 and the update system 199 causes an electronic display, HUD or 3D-HUD of the vehicle 123 to display a warning message for the driver of the vehicle 123 which visually indicates that the function update will not be presently completed.

In some embodiments, the execution deadline 151 is determined by the update system 199 based on driving conditions being experienced by the vehicle 123. The driving conditions are described by the BSM data 195 received from one or more other DSRC-equipped devices such as the remote vehicle 124 and the RSU 104. For example, the update system 199 includes code and routines that are operable, when executed by the processor of the vehicle 123, to cause the processor to analyze the BSM data 195 and determine the execution deadline 151. For example, if the BSM data 195 includes digital data that indicates that a location of an event flag will be reached by the vehicle 123 in X seconds, then the update system 199 determines that the execution deadline 151 is X−Y seconds where Y<X. In some embodiments, multiple event flags received from multiple other DSRC-equipped devices increases the accuracy for the execution deadline 151 or increases the confidence of the update system 199 in the execution deadline 151.

The execution deadline 151 may be represented by the variable $T_E'$, which is assigned a value (e.g., a time for the hard deadline) which is described by the execution deadline 151.

Referring now to FIG. 1D, depicted is a block diagram illustrating the resource constraint data 146 according to some embodiments.

The FPGA max power consumption 152 is digital data that describes a maximum allowed power consumption for the FPGA 184. In some embodiments, the FPGA max power consumption 152 places a limit on how quickly the FPGA 184 can be reconfigured since the FPGA 184 can be reconfigured quicker if more power is allowed to be consumed. In some embodiments, the FPGA max power consumption 152 places a limit on whether implementation decision can be to implement the function update via FPGA 184 since doing so may cause operation of the FPGA 184 to exceed the maximum allowed power consumption for the FPGA 184, which indicates that the implementation decision should be to implement the function update as a software update.

The FPGA max power consumption 152 may be represented by the variable $P_{EF}'$, which is assigned a value (e.g., an amount of Watts or some other unit of power) which is described by the FPGA max power consumption 152.

The FPGA max area 153 is digital data that describes a maximum allowed area which is available for reconfiguration when reconfiguring the FPGA 184 to implement the function update. In some embodiments, the FPGA max area 153 places a limit on whether implementation decision can be to implement the function update via FPGA 184 since doing so may require reconfiguration of more area of the FPGA 184 than is allowed by FPGA max area 153, which indicates that the implementation decision should be to implement the function update as a software update.

The FPGA max area 153 may be represented by the variable $A_{EF}'$, which is assigned a value (e.g., an area) which is described by the FPGA max area 153.

Figure 1F:
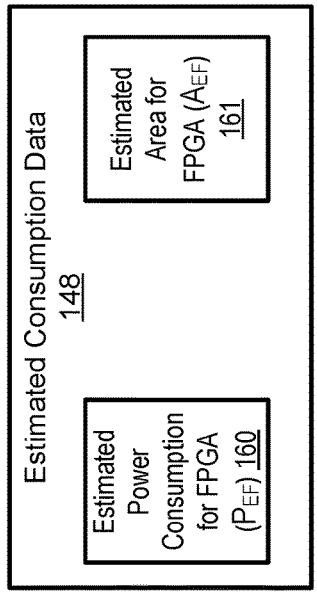
FIG. 1F is a block diagram illustrating estimated consumption data according to some embodiments.
Figure 1G:
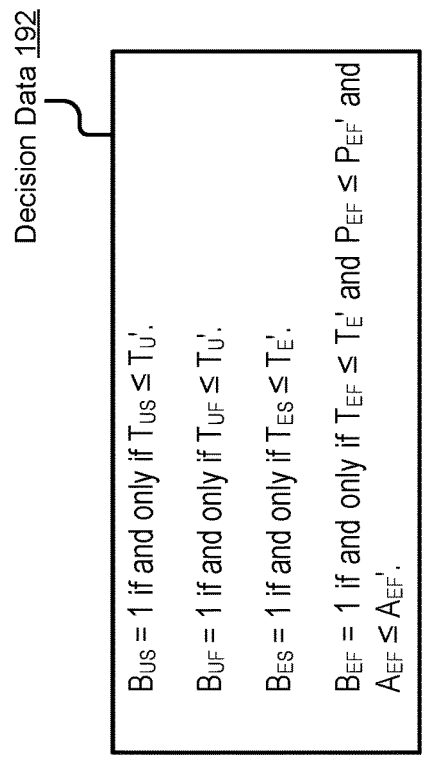
FIG. 1G is a block diagram illustrating decision data according to some embodiments.
Figure 1E:
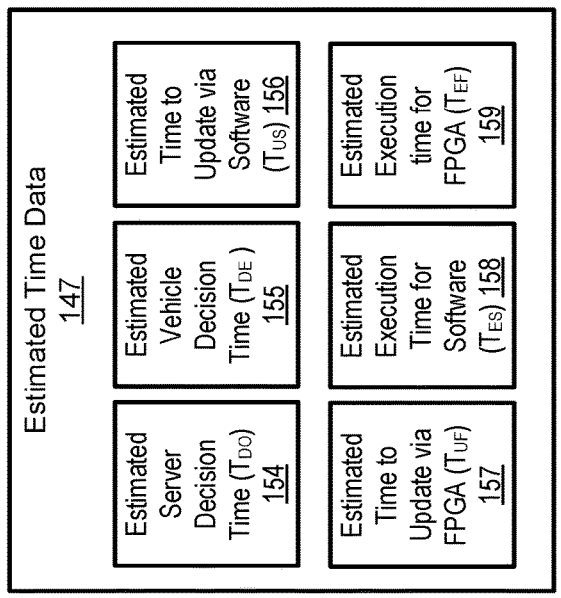
FIG. 1E is a block diagram illustrating estimated time data according to some embodiments.

Referring now to FIG. 1E, depicted is a block diagram illustrating the estimated time data 147 according to some embodiments.

The estimated server decision time 154 is digital data that describes an estimate of the amount of time that will be needed for the update system 199 of the server 103 to make the implementation decision.

The estimated server decision time 154 may be represented by the variable $T_{DO}$, which is assigned a value (e.g., an amount of time) which is described by the estimated server decision time 154.

The estimated vehicle decision time 155 is digital data that describes an estimate of the amount of time that will be needed for the update system 199 of the vehicle 123 to make the implementation decision.

The estimated vehicle decision time 155 may be represented by the variable $T_{DE}$, which is assigned a value (e.g., an amount of time) which is described by the estimated vehicle decision time 155.

The estimated time to update via software 156 is digital data that describes an estimate of the amount of time that will be needed to complete one or more of the following tasks: downloading the update data 191 to the vehicle 123 from the server 103 via the network 105 when the function update is implemented via a software update; and completely install the executable file described by the update data 191 so that the executable file is installed in the vehicle 123 (e.g., installed in the ADAS data 194).

For example, the estimated time to update via software 156 describes an amount of time to download the update data 192 from the server 103 to the vehicle 123 via the network 105. In some embodiments, the estimated time to update via software 156 is digital data that describes size of the software installation (e.g., the size of the executable file) over the speed of the software installation (e.g., how quickly the executable file can be completely executed).

The estimated time to update via software 156 may be represented by the variable $T_{US}$, which is assigned a value (e.g., an amount of time) which is described by the estimated time to update via software 156.

The estimated time to update via FPGA 157 is digital data that describes an estimate of the amount of time that will be needed to complete one or more of the following tasks: transmit a bitstream including the update data 191 to the vehicle 123 from the server 103 via the network 105 when the function update is implemented by reconfiguring the FPGA 184; and reconfigure the FPGA 184 based on the update data 191 so that the function update is installed in the vehicle 123.

The estimated time to update via FPGA 157 may be represented by the variable $T_{UF}$, which is assigned a value (e.g., an amount of time) which is described by the estimated time to update via FPGA 157. In some embodiments, the estimated time to update via FPGA 157 describes a size of the FPGA configuration over a speed of the FPGA configuration. In some embodiments, the following condition is generally, but not always, true: $T_{UF} > T_{US}$.

The estimated execution time for software 158 is digital data that describes an estimate of the amount of time that will be needed to execute the function update after it is installed in the vehicle 123. For example, the estimated execution time for software 158 describes the amount of time it takes to completely execute the ADAS data 194 after the executable file described by the update data 191 is installed in the ADAS data 194 (or replaces the ADAS data 194). In some embodiments, the estimated execution time for software 158 is a normalized execution time for the executable file multiplied by a scale. In some embodiments, the scale is variable depending on the hardware type upon which the function update is deployed within the vehicle 123.

The estimated execution time for software 158 may be represented by the variable $T_{ES}$, which is assigned a value (e.g., an amount of time) which is described by the estimated execution time for software 158.

The estimated execution time for FPGA 159 is digital data that describes an estimate of the amount of time that will be needed to execute the function update after the FPGA 184 is reconfigured based on the update data 191 (which may be delivered via a bitstream). For example, the estimated execution time for software 158 describes the amount of time it takes to completely execute the reconfigured FPGA 159 after the function update is implemented. In some embodiments, the estimated execution time for FPGA 159 is a normalized execution time for the reconfigured FPGA 184 multiplied by a scale. In some embodiments, the scale is variable depending on different attributes of the FPGA 184.

The estimated execution time for FPGA 159 may be represented by the variable $T_{EF}$, which is assigned a value (e.g., an amount of time) which is described by the estimated execution time for FPGA 159. In some embodiments, the following condition is generally, but not always, true: $T_{EF} < T_{ES}$.

Referring now to FIG. 1F, depicted is a block diagram illustrating estimated consumption data 148 according to some embodiments.

The estimated power consumption for FPGA 160 is digital data that describes an estimate of the amount of power needed to execute the FPGA 184 after it is reconfigured based on the update data 191.

The estimated power consumption for FPGA 160 may be represented by the variable $P_{EF}$, which is assigned a value (e.g., an amount of power) which is described by the estimated power consumption for FPGA 160.

The estimated area for FPGA 161 is digital data that describes an estimate of the amount of area of the FPGA 184 which will need to be reconfigured in order to implement the function update described by the update data 191.

The estimated area for FPGA 161 may be represented by the variable $A_{EF}$, which is assigned a value (e.g., an area) which is described by the estimated area for FPGA 161.

Referring now to FIG. 1G, depicted is a block diagram illustrating decision data 192 according to some embodiments. In some embodiments, the decision data 192 is digital data that describes variables and the values assigned to these variables based on the relative values of the different elements of the system data 190 depicted in FIG. 1G.

Referring now to FIG. 1H, depicted is a block diagram illustrating analysis data 193 according to some embodiments. In some embodiments, the analysis data 193 is digital data that describes the possible implementation decisions which will be made by the update system 199 based on the variables and the values assigned with regards to the decision data 192 and the system data 190. In some embodiments, the actual implementation decision which is made by the update system 199 is always described by the analysis data 193 depending on the application of decision data 192 to the system data 190.

Figure 1I:
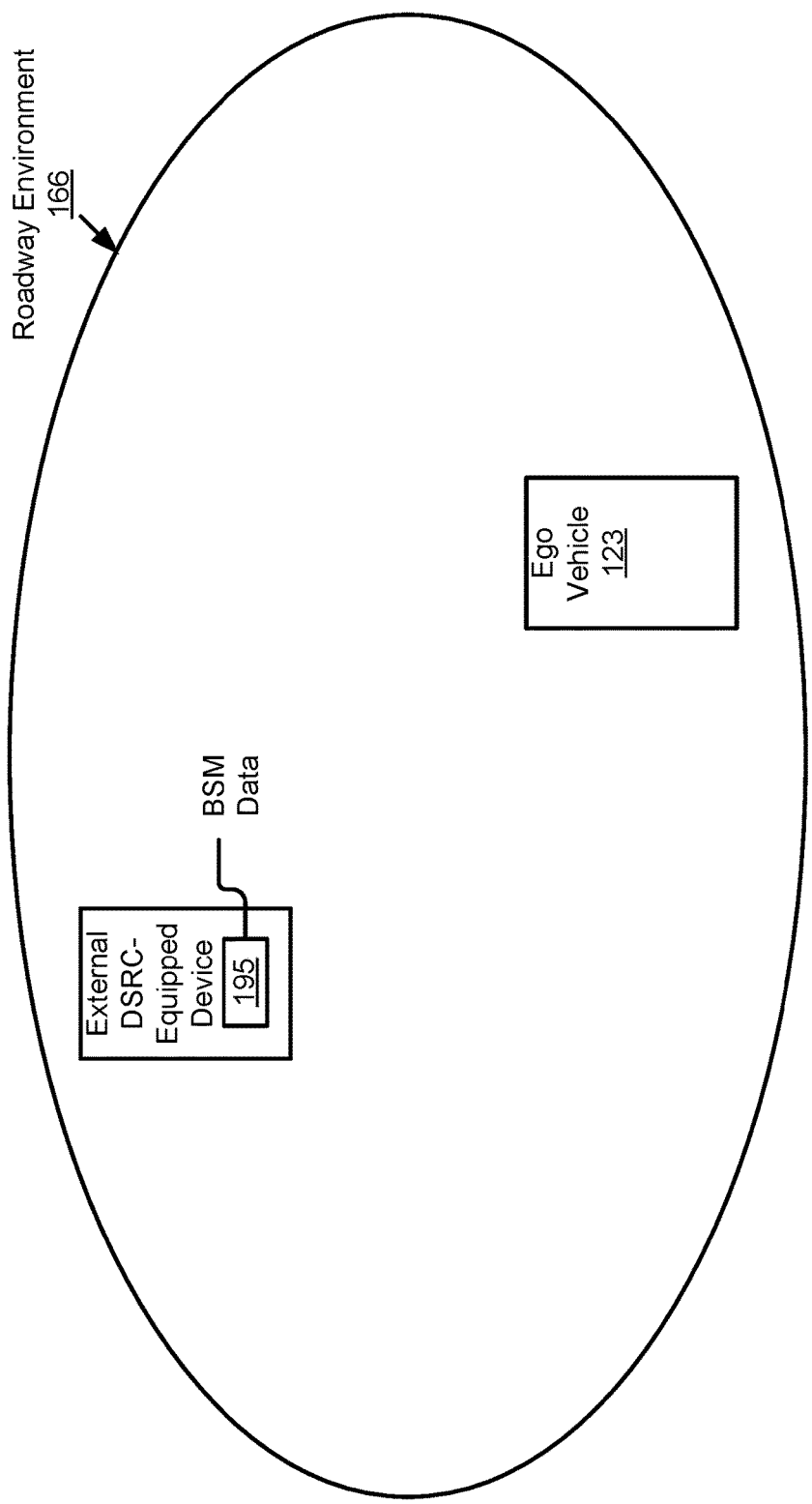
FIG. 1I is a block diagram illustrating a roadway environment according to some embodiments.

Referring now to FIG. 1I, depicted is a block diagram illustrating a roadway environment 166 according to some embodiments.

Figure 2:
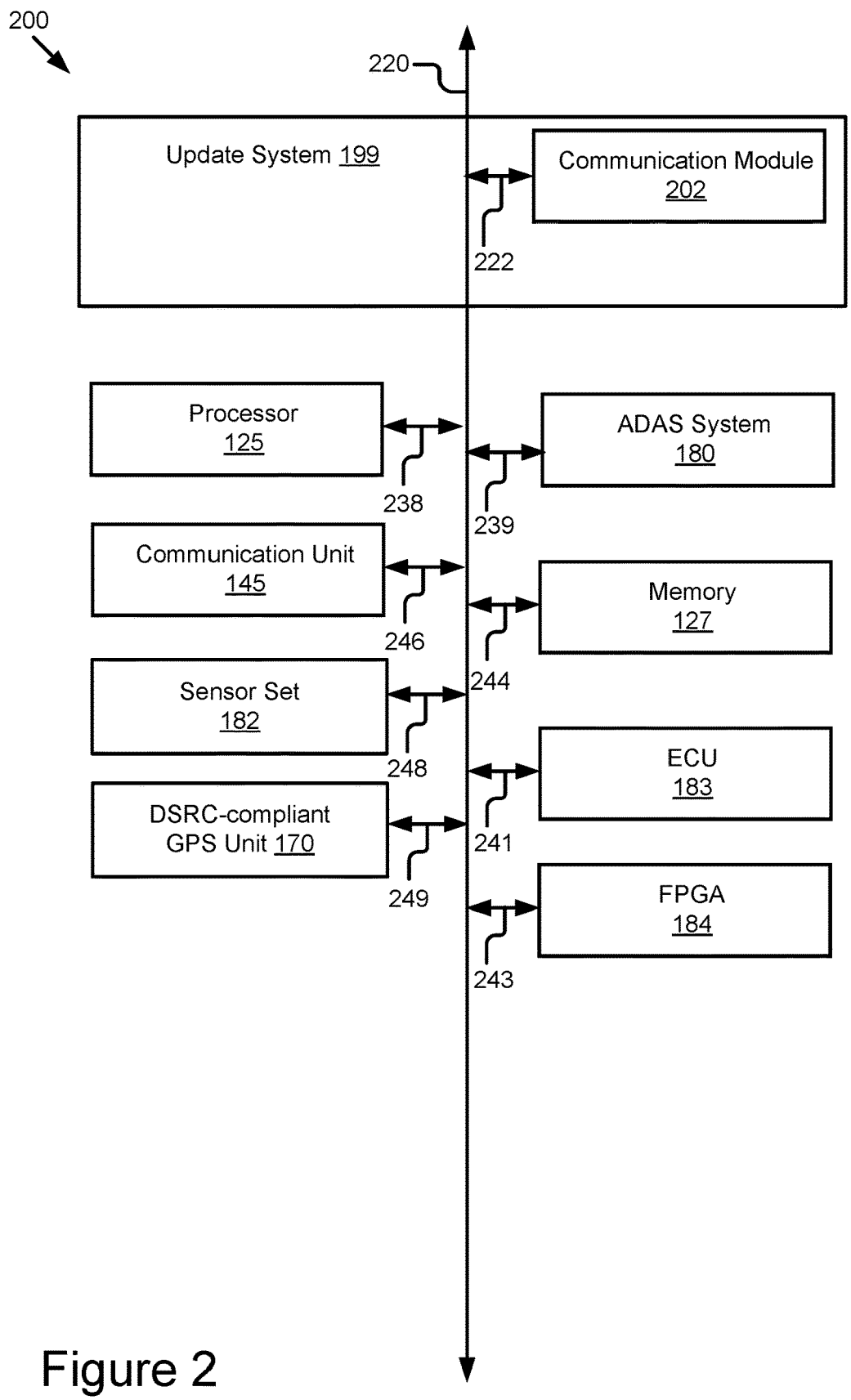
FIG. 2 is a block diagram illustrating an example computer system including an update system according to some embodiments.

Referring now to FIG. 2, depicted is a block diagram illustrating an example computer system 200 including an update system 199 according to some embodiments.

In some embodiments, the computer system 200 may include a special-purpose computer system that is programmed to perform one or more steps of a method 300 described below with reference to FIGS. 3A-3C.

In some embodiments, the computer system 200 may be an element of one or more of the following devices: the vehicle 123; the server 103; the RSU 104; and the remote vehicle 124.

In some embodiments, the computer system 200 may be an onboard vehicle computer of a device such as one or more of the following: the vehicle 123; the server 103, the RSU 104; and the remote vehicle 124.

In some embodiments, the computer system 200 may include an engine control unit, head unit or some other processor-based computing device of the vehicle 123 or the remote vehicle 124.

The computer system 200 may include one or more of the following elements according to some examples: the update system 199; the processor 125; the communication unit 145; the sensor set 182; the DSRC-compliant GPS unit 170; the ADAS system 180; the memory 127; the ECU 183; and the FPGA 184. The components of the computer system 200 are communicatively coupled by a bus 220.

In the illustrated embodiment, the processor 125 is communicatively coupled to the bus 220 via a signal line 238. The communication unit 145 is communicatively coupled to the bus 220 via a signal line 246. The sensor set 182 is communicatively coupled to the bus 220 via a signal line 248. The DSRC-compliant GPS unit 170 is communicatively coupled to the bus 220 via a signal line 249. The ADAS system 180 is communicatively coupled to the bus 220 via a signal line 239. The memory 127 is communicatively coupled to the bus 220 via a signal line 244. The ECU 183 is communicatively coupled to the bus 220 via a signal line 241. The FPGA 184 is communicatively coupled to the bus 220 via a signal line 243.

The following elements of the computer system 200 were described above with reference to FIG. 1A, and so, those descriptions will not be repeated here: the update system 199; the processor 125 (whose description is the same as the processor 125A); the communication unit 145 (whose description is the same as the communication unit 145A); the sensor set 182; the DSRC-compliant GPS unit 170; the ADAS system 180; the memory 127 (whose description is the same as the memory 127A); the ECU 183; and the FPGA 184.

The memory 127 stores any or all of the data described above with reference to FIGS. 1A-1I and below with reference to FIGS. 3A-3C, 4A and 4B.

In the illustrated embodiment shown in FIG. 2, the update system 199 includes a communication module 202 which is communicatively coupled the bus 220. In some embodiments, components of the update system 199 can be stored in a single server or device. In some other embodiments, components of the update system 199 can be distributed and stored across multiple servers or devices. For example, some of the components of the update system 199 may be distributed across the server 103 and the vehicle 123.

The communication module 202 can be software including routines for handling communications between the update system 199 and other components of the computer system 200. In some embodiments, the communication module 202 can be a set of instructions executable by the processor 125 to provide the functionality described below for handling communications between the update system 199 and other components of the computer system 200.

The communication module 202 sends and receives data, via the communication unit 145, to and from one or more elements of the operating environment 100 or the flow process 111. For example, the communication module 202 receives or transmits, via the communication unit 145, some or all of the data described above with reference to FIGS. 1A-1I, FIGS. 3A-3C and FIGS. 4A and 4B.

In some embodiments, the communication module 202 receives data from components of the update system 199 and stores the data in the memory 127. For example, the communication module 202 receives a BSM message including the BSM data 195 and stores the BSM data 195 in the memory 127.

In some embodiments, the communication module 202 may handle communications between components of the update system 199. For example, the communications module 202 may retrieve data from the memory 127 which is then analyzed or processed by the update system 199 as described below with reference to FIGS. 3A-3C.

In some embodiments, the communication module 202 can be stored in the memory 127 of the computer system 200 and can be accessible and executable by the processor 125. The communication module 202 may be adapted for cooperation and communication with the processor 125A and other components of the computer system 200 via signal line 222.

Figure 3A:
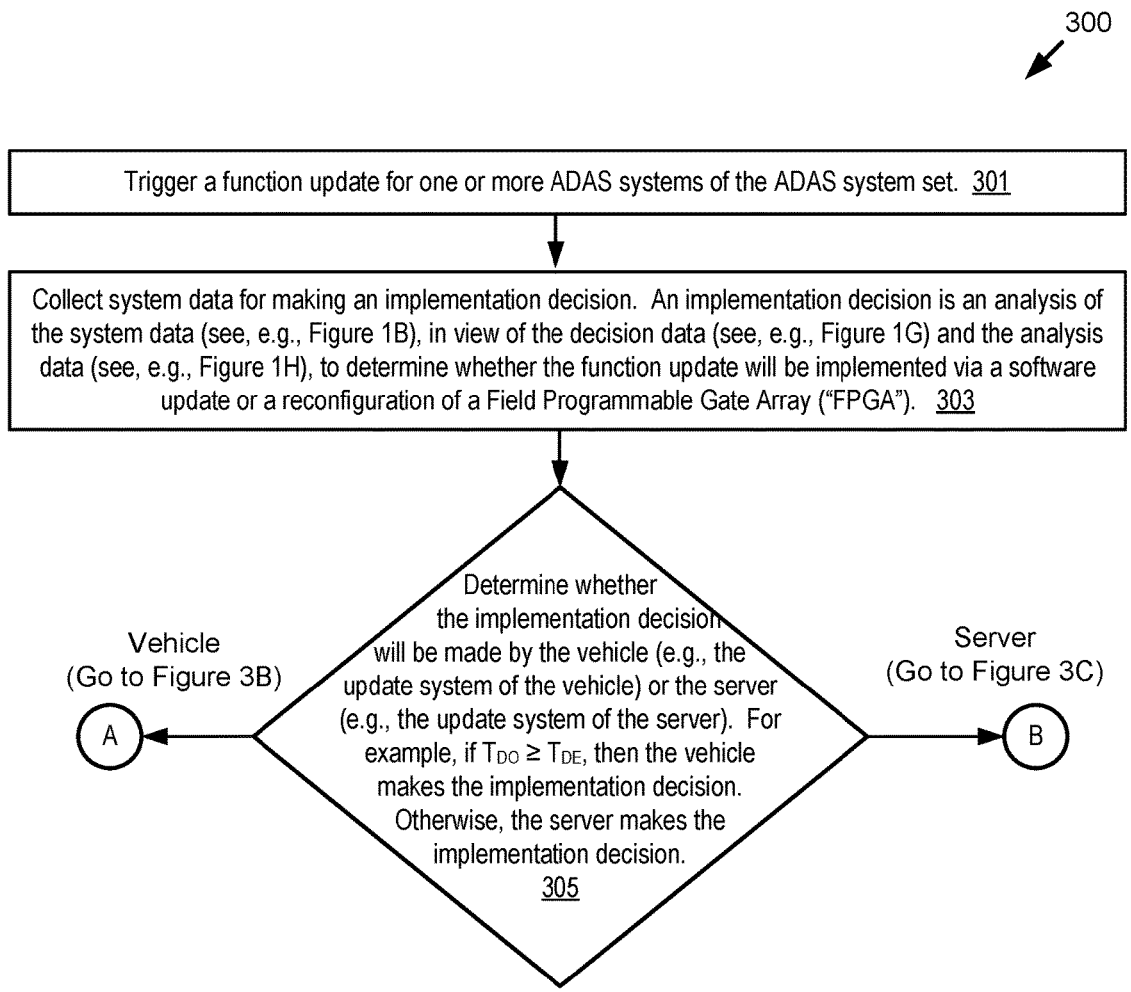
FIGS. 3A through 3C are a flowchart of an example method for making an implementation decision according to some embodiments.
Figure 3B:
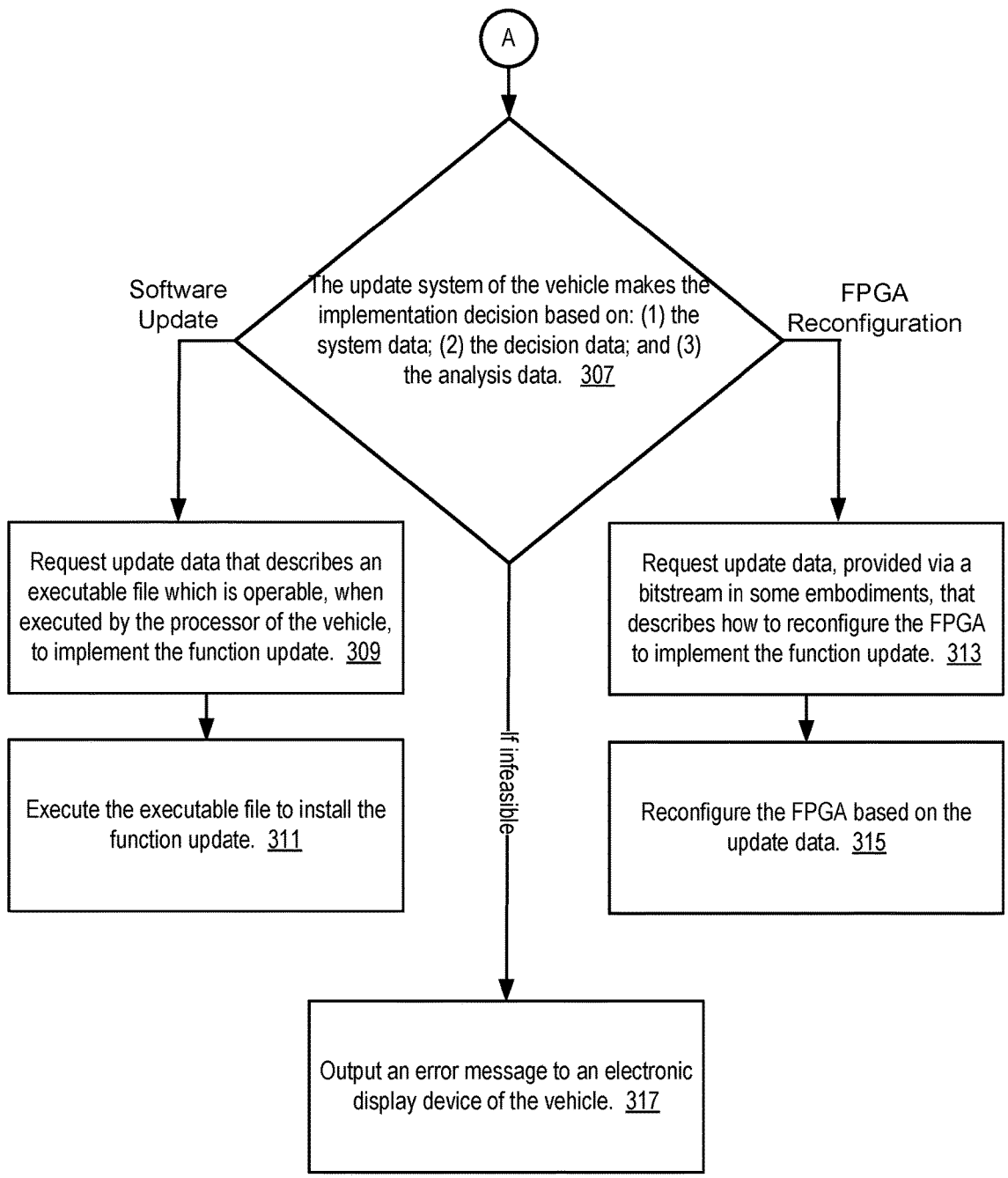
Figure 3C:
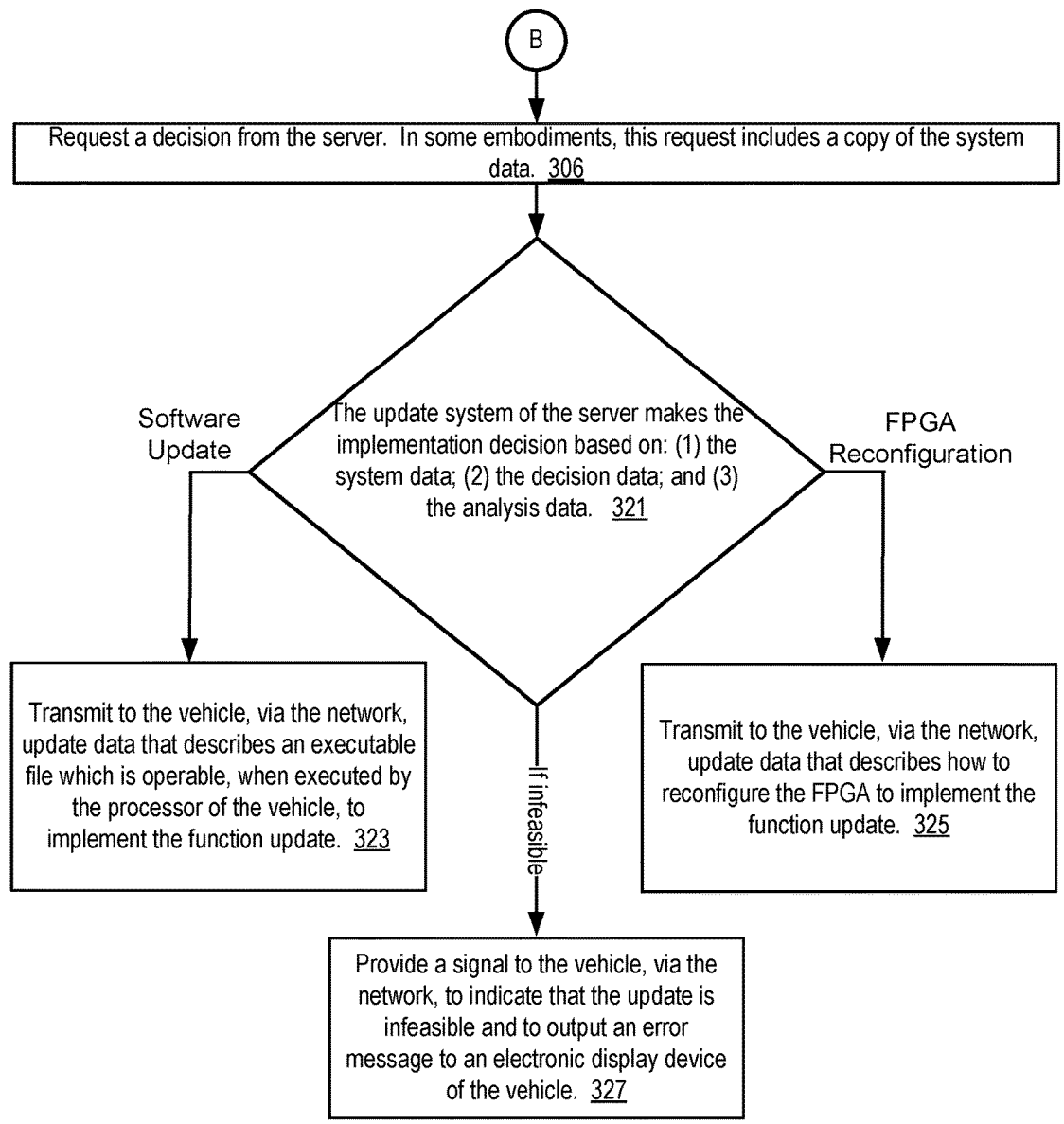

Referring now to FIGS. 3A through 3C, depicted is a flowchart of an example method 300 for making an implementation decision according to some embodiments. One or more of the steps described herein for the method 300 may be executed by one or more update systems.

At step 301, a function update for one or more ADAS systems of the ADAS system set.

At step 303, system data for making an implementation decision is collected or aggregated. An implementation decision is an analysis of the system data (see, e.g., FIG. 1B), in view of the decision data (see, e.g., FIG. 1G) and the analysis data (see, e.g., FIG. 1H), to determine whether the function update will be implemented via a software update or a reconfiguration of an FPGA.

At step 305, a determination is made regarding whether the implementation decision will be made by the vehicle or the server. For example, if $T_{DO} \geq T_{DE}$, then the vehicle makes the implementation decision and the method 300 proceeds to step 307 of FIG. 3B. Otherwise, the server makes the implementation decision and the method 300 proceeds to step 306 of FIG. 3C.

Referring now to FIG. 3B. At step 307, the update system of the vehicle makes the implementation decision based on: (1) the system data; (2) the decision data; and (3) the analysis data. If the implementation decision is to make the function update via a software update, then the method 300 proceeds to step 309. If the implementation decision is to make the function update by reconfiguring the FPGA, then the method 300 proceeds to step 313. If the implementation decision is that the function update is not feasible, then the method 300 proceeds to step 317.

At step 309, the update system of the vehicle causes the communication unit of the vehicle to transmit a request for update data to the server via the network. The update data describes an executable file which is operable, when executed by the processor of the vehicle, to implement the function update.

At step 311, a wireless message including the update data is received by the communication unit of the vehicle and the executable file described by the update data is executed to install the function update.

At step 313, the update system of the vehicle causes the communication unit of the vehicle to transmit a wireless message to the server via the network which requests update data, provided via a bitstream in some embodiments, that describes how to reconfigure the FPGA to implement the function update.

At step 315, the bitstream is received by the communication unit of the vehicle and the FPGA is reconfigured by the update system based on the update data included in the bitstream.

At step 317, the update system causes an electronic display, HUD or 3D-HUD of the vehicle to output an error message.

Referring now to FIG. 3C. At step 321, the update system of the server makes the implementation decision based on: (1) the system data; (2) the decision data; and (3) the analysis data. If the implementation decision is to make the function update via a software update, then the method 300 proceeds to step 323. If the implementation decision is to make the function update by reconfiguring the FPGA, then the method 300 proceeds to step 325. If the implementation decision is that the function update is not feasible, then the method 300 proceeds to step 327.

At step 323, the update system of the server causes the communication unit of the server to transmit to the vehicle, via the network, update data that describes an executable file which is operable, when executed by the processor of the vehicle, to implement the function update.

At step 325, the update system of the server causes the communication unit of the server to establish a bitstream with the communication unit of the vehicle and then to transmit, via the bitstream, the update data to the communication unit of the vehicle.

At step 327, the update system of the server causes the communication unit of the server to transmit, via the network, an electronic signal (or electronic message) to the communication unit of the vehicle which causes the electronic display of the vehicle to display an error message.

Referring now to FIG. 4A, depicted is a block diagram illustrating an example of the BSM data 195 according to some embodiments.

The regular interval for transmitting BSMs may be user configurable. In some embodiments, a default setting for this interval may be transmitting the BSM every 0.10 seconds or substantially every 0.10 seconds.

A BSM is broadcasted over the 5.9 GHz DSRC band. DSRC range may be substantially 1,000 meters. In some embodiments, DSRC range may include a range of substantially 100 meters to substantially 1,000 meters.

Referring now to FIG. 4B, depicted is a block diagram illustrating an example of BSM data 195 according to some embodiments.

A BSM may include two parts. These two parts may include different BSM data 195 as shown in FIG. 4B.

Part 1 of the BSM data 195 may describe one or more of the following: vehicle position; vehicle heading; vehicle speed; vehicle acceleration; vehicle steering wheel angle; and vehicle size.

Part 2 of the BSM data 195 may include a variable set of data elements drawn from a list of optional elements. Some of the BSM data 195 included in Part 2 of the BSM are selected based on event triggers, e.g., anti-locking brake system ("ABS") being activated may trigger BSM data 195 relevant to the ABS system of the vehicle.

In some embodiments, some of the elements of Part 2 are transmitted less frequently in order to conserve bandwidth.

In some embodiments, the BSM data 195 included in a BSM includes current snapshots of a vehicle traveling along a roadway system.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method that improves performance of a vehicle by implementing a function update for an Advanced Driver Assistance System ("an ADAS system") of the vehicle by modifying a Field-Programmable Gate Array ("FPGA") of the vehicle by determining that it is time effective as compared to implementing the function update using a software update, the method comprising:
   receiving a Dedicated Short Range Communication message ("a DSRC message") on a 5.9 gigahertz band, wherein the DSRC message includes digital data that describes a driving situation of one or more other vehicles in relation to the vehicle;

determining a set of conditions for implementing the function update of the ADAS system by modifying the FPGA instead of the software update that includes that a first time for the software update is within an update deadline, a second time for an FPGA update is within the update deadline, an estimated software execution time fails to be within an execution deadline, an estimated FPGA execution time is within the execution deadline, an estimated FPGA power consumption is within an FPGA maximum power consumption, and an estimated FPGA area is within an FPGA maximum area;

determining, based on the driving situation described by the digital data and system data describing a current situation of the vehicle, to implement the function update for the ADAS system of the vehicle which is operable to control an operation of the ADAS system when the determined set of conditions are met; and in response to the determination that the determined set of conditions are met, modifying the FPGA of the vehicle to implement the function update so that the FPGA controls the operation of the ADAS system in a manner that conforms to the function update.

2. The method of claim 1, wherein the DSRC message is a Basic Safety Message ("a BSM message") and the digital data is BSM data.

3. The method of claim 1, wherein the DSRC message is transmitted to the vehicle by a Roadside Unit ("an RSU").

4. The method of claim 1, wherein the digital data describes a geographic location of the one or more other vehicles with an accuracy of plus or minus 1.5 meters relative to an actual geographic location of the one or more other vehicles.

5. The method of claim 1, wherein the FPGA is an element of an electronic control unit of the vehicle.

6. The method of claim 1, wherein the FPGA is reconfigured based on update data which describes how to reconfigure the FPGA in order to implement the function update.

7. The method of claim 1, wherein the function update modifies a functionality provided by the ADAS system.

8. A system that improves performance of a vehicle by implementing a function update for an Advanced Driver Assistance System ("an ADAS system") of the vehicle by modifying a Field-Programmable Gate Array ("FPGA") of the vehicle by determining that it is time effective as compared to implementing the function update using a software update, the vehicle comprising:

the ADAS System;

a Dedicated Short Range Communication receiver ("a DSRC receiver");

the FPGA; and an onboard vehicle computer system that is communicatively coupled to the ADAS system, the DSRC receiver and the FPGA, the onboard vehicle computer system including a non-transitory memory storing computer code which, when executed by the onboard vehicle computer system causes the onboard vehicle computer system to:

receive, by the DSRC receiver, a Dedicated Short Range Communication message ("a DSRC message") on a 5.9 gigahertz band, wherein the DSRC message includes digital data that describes a driving situation of one or more other vehicles in relation to the vehicle;

determine a set of conditions for implementing the function update of the ADAS system by modifying the FPGA instead of the software update that includes that a first time for the software update is within an update deadline, a second time for an FPGA update is within the update deadline, an estimated software execution time fails to be within an execution deadline, an estimated FPGA execution time is within the execution deadline, an estimated FPGA power consumption is within an FPGA maximum power consumption, and an estimated FPGA area is within an FPGA maximum area;

determine, based on the driving situation described by the digital data and system data describing a current situation of the vehicle, to implement a function update for the ADAS system which is operable to control an operation of the ADAS system when the determined set of conditions are met; and in response to the determination that the determined set of conditions are met, modifying the FPGA to implement the function update so that the FPGA controls the operation of the ADAS system in a manner that conforms to the function update.

9. The system of claim 8, wherein the DSRC message is a Basic Safety Message ("a BSM message") and the digital data is BSM data.

10. The system of claim 8, wherein the DSRC message is transmitted to the vehicle by a Roadside Unit ("an RSU").

11. The system of claim 8, wherein the digital data describes a geographic location of the one or more other vehicles with an accuracy of plus or minus 1.5 meters relative to an actual geographic location of the one or more other vehicles.

12. The system of claim 8, wherein the FPGA is an element of an electronic control unit of the vehicle.

13. The system of claim 8, wherein the FPGA is reconfigured based on update data which describes how to reconfigure the FPGA in order to implement the function update.

14. The system of claim 8, wherein the function update modifies a functionality provided by the ADAS system.

15. A computer program product that improves performance of a vehicle by implementing a function update for an Advanced Driver Assistance System ("an ADAS system") of the vehicle by modifying a Field-Programmable Gate Array ("FPGA") of the vehicle by determining that it is time effective as compared to implementing the function update using a software update, the computer program product comprising a non-transitory memory of an onboard vehicle computer system of a vehicle storing computer-executable code that, when executed by a processor, causes the processor to:

receive a Dedicated Short Range Communication message ("a DSRC message") on a 5.9 gigahertz band, wherein the DSRC message includes digital data that describes a driving situation of one or more other vehicles in relation to the vehicle;

determine a set of conditions for implementing the function update of the ADAS system by modifying the FPGA instead of the software update that includes that a first time for the software update is within an update deadline, a second time for an FPGA update is within the update deadline, an estimated software execution time fails to be within an execution deadline, an estimated FPGA execution time is within the execution deadline, an estimated FPGA power consumption is within an FPGA maximum power consumption, and an estimated FPGA area is within an FPGA maximum area;

determine, based on the driving situation described by the digital data and system data describing a current situation of the vehicle, to implement a function update for the ADAS system of the vehicle by modifying the FPGA of the vehicle which is operable to control an operation of the ADAS system when the determined set of conditions are met; and in response to the determination that the determined set of conditions are met, modify the FPGA of the vehicle to implement the function update so that the FPGA controls the operation of the ADAS system in a manner that conforms to the function update.

16. The computer program product of claim 15, wherein the DSRC message is a Basic Safety Message ("a BSM message") and the digital data is BSM data.

17. The computer program product of claim 15, wherein the DSRC message is transmitted to the vehicle by a Roadside Unit ("an RSU").

18. The computer program product of claim 15, wherein the digital data describes a geographic location of the one or more other vehicles with an accuracy of plus or minus 1.5 meters relative to an actual geographic location of the one or more other vehicles.

19. The computer program product of claim 15, wherein the FPGA is an element of an electronic control unit of the vehicle.

20. The computer program product of claim 15, wherein the FPGA is reconfigured based on update data which describes how to reconfigure the FPGA in order to implement the function update.

* * * * *